United States Patent [19]

Rivat-Lahousse

[11] 3,709,651

[45] Jan. 9, 1973

[54] APPARATUS FOR THE PRODUCTION OF SHAPED ARTICLES OF EXPANDED COHERED GRANULES OF THERMOPLASTIC MATERIAL, IN PARTICULAR POLYSTYRENE

[75] Inventor: Andre Rivat-Lahousse, Paris, France

[73] Assignee: Saint-Gobain, Neuilly sur Seine, France

[22] Filed: Sept. 8, 1970

[21] Appl. No.: 69,905

Related U.S. Application Data

[62] Division of Ser. No. 781,372, Dec. 5, 1968, abandoned.

[52] U.S. Cl. .................... 425/4, 264/51, 425/126, 425/449
[51] Int. Cl. .................... B29d 27/00, B29g 7/02
[58] Field of Search ....... 18/5 A, 4 B; 264/47, 51, 53; 425/126, 129, 242, 4, 258, 447

[56] References Cited

UNITED STATES PATENTS

| | | | |
|---|---|---|---|
| 3,214,794 | 11/1965 | Otis | 425/4 |
| 3,230,287 | 1/1966 | Caron et al. | 425/83 X |
| 3,257,685 | 6/1966 | Batow et al. | 425/261 |
| 3,347,961 | 10/1967 | Russell | 425/4 X |

Primary Examiner—Robert L. Spicer, Jr.
Attorney—John L. Seymour et al.

[57] ABSTRACT

Method and apparatus for treating discrete granules of thermoplastic material, such as polystyrene, to form articles of desired shapes and forms. The granules, containing a blowing agent, are rapidly preheated to about their softening temperature and immediately deposited into a mold which is preferably also preheated. After enclosure in the mold, the material is insufflated with steam to cause expansion and cohesion of the granules to create the desired shape or form such as blocks, plates, sheets and specially-shaped articles as determined by the molding means. The steam may be saturated, under pressure, or superheated and at atmospheric pressure. In the latter case the temperature is about that of the softening point of the material, such as 115° C in the case of polystyrene, and the method can be carried out without use of an autoclave and in a continuous procedure. The granules may be preheated and conveyed to the mold, at one and the same time, by entraining them with heated gas, thus conveying them in and through a duct, into the mold. The entraining gas, such as air, may be at a temperature above the softening point of the granules, provided the time of transit from supply hopper to mold is small and just long enough to effect the desired temperature of preheat to the granules.

8 Claims, 5 Drawing Figures

APPARATUS FOR THE PRODUCTION OF SHAPED ARTICLES OF EXPANDED COHERED GRANULES OF THERMOPLASTIC MATERIAL, IN PARTICULAR POLYSTYRENE

This application is a division of U.S. Ser. No. 781,372, filed Dec. 5, 1968 now abandoned.

The present invention relates to a method and apparatus for the production of blocks, sheets, plates, and various other shapes and forms of expanded, cohered granules or pearls of thermoplastic material such as polystyrene. The method may be carried out in a discontinuous procedure as by a closed mold, or continuously by means, for example, of conveyor belts having confronting spaced runs and between which the material is passed in treatment in accordance with the invention.

In the prior art production by closed molds the heating to effect expansion of the granules within the mold, is frequently carried out by use of saturated steam at a pressure above atmospheric, or by a mixture of steam and air, using an autoclave. It has been observed however that the blocks, plates, sheets or other forms thus produced frequently have densities which vary from place to place within the article. For example, the density adjacent the walls of the mold will often be much greater than in zones within the article. In fact, the density of portions of the article adjacent the surface thereof may be as much as 1.1 to 2 times that of interior portions thereof. This heterogeneity of density in an article thus produced, is highly undesirable where articles are preferably to have, or must have, the same thermal and mechanical qualities throughout.

The present invention has for its chief object the provision of a method which is especially valuable in the production of articles essentially homogenous and which may be materially less in density than like products obtained by prior art procedures.

It is a further object to provide a method and an apparatus which enables one to obtain a better bond or cohesion between the expanded granules and to impart to them better dimensional stability to articles formed from the improved product.

In contradistinction to prior art procedures wherein the expansible particles or granules are cold when placed in the mold and subsequently heated therein with saturated steam, the present invention involves the introduction of the granules into the mold, after they have been preheated to a temperature in the vicinity of their softening point. Then the expansion of the granules and their molding to desired shape, is effected by insufflation with steam, within the mold. If the molded thermoplastic material is polystyrene, the temperature to which the granules are brought before their introduction into the mold, is about 110° to 115° C.

By the present novel procedure the steam introduced into the mold has no tendency to condense in considerable quantities, upon the cool exterior surfaces of the granules, as is does in prior art procedures. In such prior art methods this condensate encourages and promotes inequalities of temperature in different parts of the material being molded. But as the result of the present invention the expansion of the material is much more uniform throughout the mold, and the resulting molded product has a very uniform density throughout.

Preferably the mold also is preheated before steam is fed into it. This preheating may be carried out, for example, by a double envelope or jacket into which steam is fed, or by the introduction into the mold or its jacket, of heated air, prior to the charging of the granules.

Another object of the invention is to provide a method and an apparatus for performing the method, wherein the mold is supplied with steam at atmospheric pressure, superheated to about the softening point of the thermoplastic material which, in the case of polystyrene, is about 115° C. The use of superheated steam at atmospheric pressure renders it unnecessary to employ an autoclave or a closed, steam-tight or pressure-tight mold. This greatly simplifies the installation and reduces the cost of apparatus for carrying out the invention. It also results in a decreased consumption of steam.

Preheating of the granules before they are introduced into the mold may be insufflation with heated air while contained in a heated supply hopper.

Another advantageous feature is that the preheating of the granules may be carried out while they are entrained and conveyed by heated air in and along a duct of suitable diameter, to and into the mold. In this way the preheating is conveniently effected while the granules are being conveyed or conducted toward the mold and a saving in time and cost of production is effected. The speed or rate of propulsion of the heated air and entrained granules is so selected that the granules are in transit toward the mold a time just sufficient for their heating to the desired softening temperature but which, nevertheless, is great enough to assure their transport in and along the duct. This speed will usually be between about 2 and 20 m/sec.

When fabrication is being carried out in a continuous procedure, by means of a belt-type conveyor for example, the apparatus may include a section disposed upstream of the molding means, and operable to preheat the granules with heated air as they move with the conveyor toward the molding means or section of the apparatus. As previously stated, this temperature of preheating will, in the case of polystyrene, be about 115° C., or more in case the granules are not allowed to remain too long in contact with the air thus heated. Such preheating results in a homogenous temperature throughout the mass of granules, and results in the material being at is softening point, uniformly and throughout.

Following the expansion phase, the pearls may be subjected to compression by means of two superposed conveyor belts which gradually approach one another in the downstream direction, or by two or more pairs of conveyor belts of which each pair has a smaller separation of its confronting runs, than the pair immediately upstream.

When the procedure is a continuous one it is possible to advantageously use steam which is superheated, instead of saturated. Such superheated steam may be at about 115° C. when polystyrene is being processed.

Due to the fact that in the case of continuous procedures in accordance with the invention, the granules undergo a heating, followed by a compression which reduces the thickness of the layer they form, by about one-half, it may be advantageous to follow the stage of preheating with heated air, with a stage of preheating with superheated steam or, alternatively, to replace entirely the preheating with heated air, by heating with superheated steam.

The foregoing objects and advantages, as well as others, will become clear to those skilled in the art, after a study of the following example and detailed description, in connection with the accompanying drawing.

The following example is given of how the invention is carried into practice by the continuous procedure of molding expanded polystyrene of commercial grade, wherein the softening temperature is about 115° C.

The molding apparatus and the granules are preheated to about 110° to 115° C. This step of heating the material is advantageously and efficiently effected while it is being conveyed from a supply hopper to the molding apparatus. Preheating of the mold is produced by heated air which also serves to entrain and convey the granules from hopper to molding apparatus and which contacts the interior walls of the mold before being exhausted to the exterior thereof. Capture, reheating and recirculation of this air is effected by suitable means. If desired or if need be, it is possible to inject heated air into the mold, after the granules have been emplaced therein. Thus it is possible to effect any necessary reheating of the granules in the mold, and thus make certain that the material is at about 115° C. In accordance with aerodynamic and thermal characteristics of the air acting to entrain and convey the granules to and into the molding means, it is initially heated to a temperature appreciably higher than 115° C., say to 130° to 150° C. It is thus made possible to preheat the granules to the desired temperature although they are in contact with the air for only a short time period. Immediately after cessation of the introduction of heated air into the molding apparatus, superheated steam at a temperature of about 115° to 117° C. is passed into contact with the granules. The time duration of this period of admission of superheated steam is from about 30 seconds to 2 minutes. The steam escapes through vents, grills, or unsealed joints of the mold. It may be aspirated by fan or blower means. The pressure of the steam in the mold is about atmospheric, more or less.

Reference is made to the drawing showing means by which the inventive method may be carried into practice and wherein.

Figure 1:
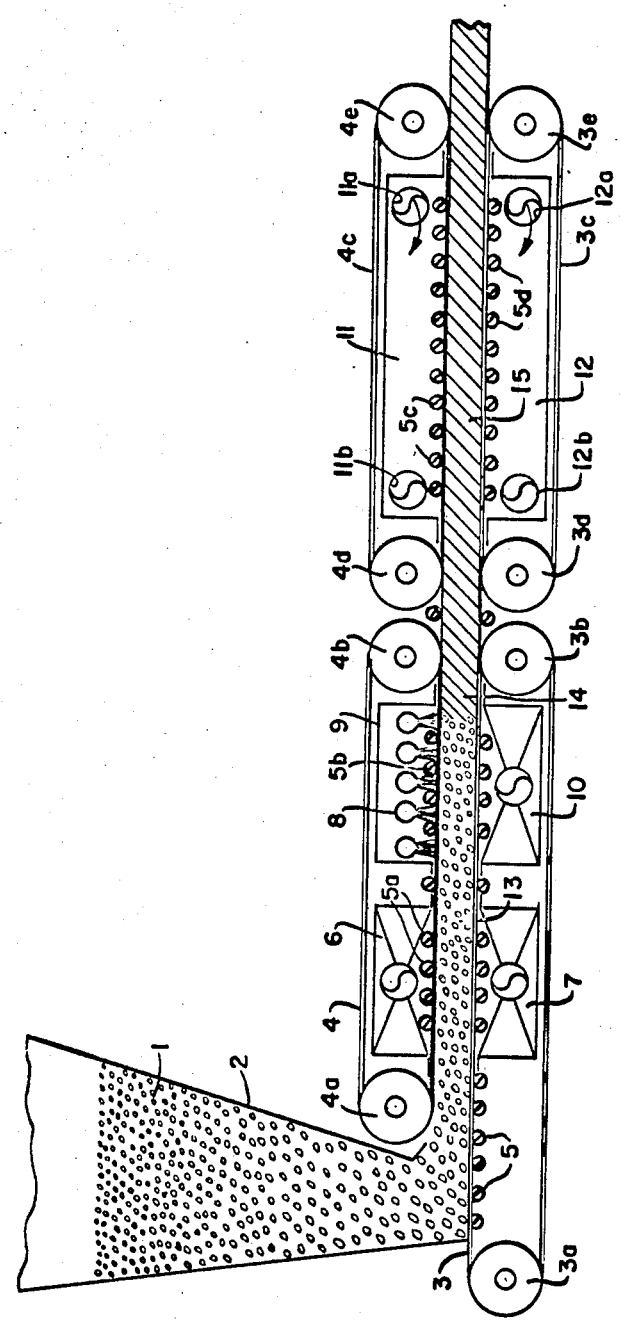
FIG. 1 is a schematic elevation, partly in section, of apparatus for continuous production in accordance with the invention.

Referring in detail to FIG. 1, granules of expansible material such as polystyrene, are confined in hopper 2 and descend by gravity onto a foraminous conveyor belt 3. This belt may be of flexible sheet steel pierced over its effective area with apertures which are small enough to prevent the granules of material from dripping through them, but which enable the ready passage of air therethrough. As shown, the belt is guided about upstream roller 3a and downstream roller 3b, one or both of which are power driven by means not shown. A plurality of small idler rollers 5 support the upper run of belt 3 so as to be essentially horizontal and planar.

A second conveyor belt 4 which, like belt 3, may be of steel and pierced with a multiplicity of apertures over its effective area, is mounted over belt 3 by means of guide rollers 4a and 4b, upstream and downstream respectively. The lower run of belt 4 confronts the upper run of belt 3 and is maintained parallel therewith by parallel idler rollers 5a spaced along and in guiding contact with the upper surface of the lower pass or run of the belt.

Just after the granules are deposited upon belt 3, in a way clear from FIG. 1, they pass in a preliminary treatment, between an upper housing 6 superposed over a lower housing 7. As shown, housing 6 is mounted between the upper and lower runs of belt 4 and is closed except for an open lower side closely adjacent the lower run of its belt. Likewise, housing 7 is mounted between the upper and lower runs of belt 3 and is closed except for its open upper side, closely adjacent the upper run of belt 3.

Thus, air heated to the desired temperature may be introduced under pressure into one of the housings 6 or 7, by conduit means not shown, and exhausted from the other housing after passing vertically through the layer of granules moving along, left to right, on and with the belts. Belt 4 will be power driven by means not shown, at the same linear speed as belt 3. Both belts may be driven by one and the same source of power. It is very important to have the air supply and air exhaust means on opposite sides, respectively, of the layer of granules indicated at 13, so that the air passes through the layer in a direction normal to its direction of movement with and between the conveyor belts, because it is thus possible to correctly control the preheating of the granules to make certain that their temperature is uniform and homogenous throughout the breadth and thickness of the layer of material formed by and between the runs of the belts. The foregoing treatment does not effect any appreciable expansion of the granules so that the interstices between them continue to exist at this stage.

In a second treatment or step the granules are contacted with saturated or superheated steam for a short period, to thus effect a rapid brutal expansion throughout the layer of preheated granules. This step is carried out as the layer of granules passes with the conveyor belts 3 and 4, between upper and lower housings 9 and 10, wherein upper housing 9 is closed except for an open lower side contiguous to the upper surface of the lower run of belt 4, and lower housing 10 is closed except for its upper open side contiguous to the lower surface of the upper run of belt 3. The steam is introduced by tubes 8 each of which extends across belt 4 and is formed with a row of apertures spaced along its lowermost longitudinal element. The tubes are supplied from a common header, not shown, and are so disposed that each directs a plurality of jets of steam between backing idler rollers 5b, and through the contiguous portion of belt 4. After traversing the layer of granules instantaneously between housings 9 and 10, the steam is exhausted from housing 10, which may be connected with aspirating means, not shown, to thereby maintain a low degree of vacuum in the housing.

The construction just described affords an excellent and uniform distribution of steam through and throughout the mass of granules instantaneously between housings 9 and 10, and thereby avoids the undesirable formation of crusts on the face of the layer adjacent the steam supply and which would otherwise be formed in case the granules were unevenly expanded. At 14 the granules are indicated as fully cohered to the desired sheet or plate form.

In a third step the expanded material is cooled rapidly as it passes from between the steam chambers to and between the parallel superposed upper and lower runs of a second pair of foraminous belts 3c and 4c, respectively. These belts may be like belts 3 and 4, previously described.

An upper housing 11 closed except for its open lower side contiguous to the lower run of belt 4c, has a supply duct 11a from which cooling air is discharged into the housing. The air passes in heat exchange relation with and over the upper surface of the layer of material 15 instantaneously between housings 11, 12, and is exhausted from upstream duct 11b. Blower means are provided to force cooling air into housing 11 and to exhaust it therefrom. Likewise a lower housing 12 is closed except for its open top. This open top is closely adjacent the upper run of lower belt 3c and is supplied with cooling air emerging from duct 12a. This air passes upstream over the lower surface of material 15 and is exhausted from the housing through duct 12b. One or both ducts 12a, 12b may be provided with blower means to assure positive and continuous circulation of cooling air upstream through housing 12. Upper and lower sets of parallel backing rollers 5c and 5d, in the respective housings 11, 12, are uniformly spaced to maintain the material at the desired thickness. The space between the confronting runs of belts 3c, 4c may be less than that between the corresponding runs of belts 3, 4, so that an additional compression of the layer of material is thereby effected.

It is also contemplated that belts 3, 3c, on the one hand, and 4, 4c on the other, may be combined each into a single long belt whose upper and lower runs pass successively through the several housings as previously described and as shown upon FIG. 1. It will be understood that in all cases, all belts are driven at closely the same linear speed.

FIGS. 2 to 5 show apparatus for carrying the invention into practice in a discontinuous procedure by use of individual molds, to form blocks, plates, sheets or specially shaped forms, particularly of polystyrene.

Figure 2:
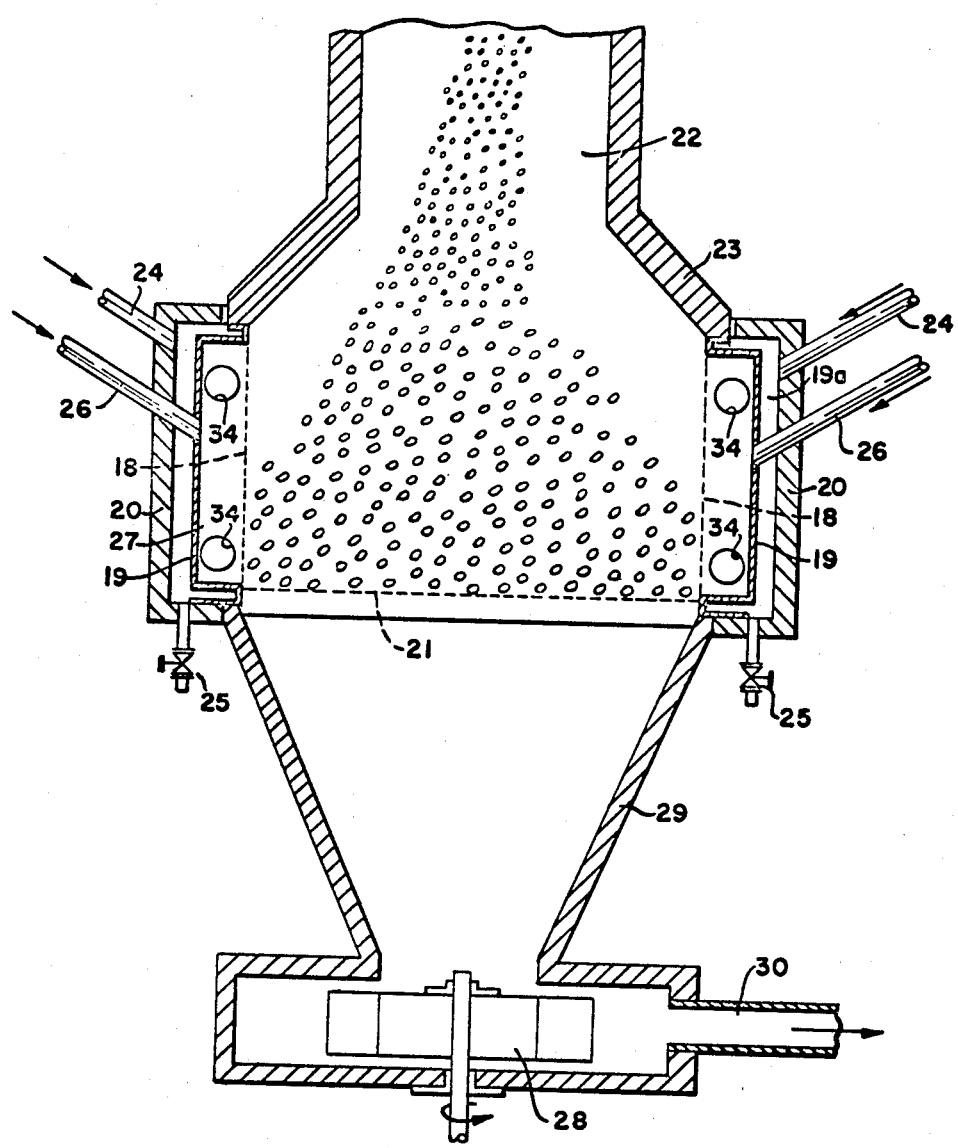
FIG. 2 is a vertical section through an alternative form of apparatus utilizing molding means in a discontinuous procedure.

Referring in particular to FIG. 2, the mold includes foraminous side walls 18 reinforced by side walls 19 which are spaced outwardly of walls 18 and are imperforate except for apertures in fluid-tight connection with supply pipes 26 for steam. As shown the walls 19 are flanged at their top and bottom edges for connection at the top, with the rim of a supply duct 23 of inverted funnel shape, and at the bottom with the rim of a funnel-shaped exhaust duct 29. At its lower portion this latter duct is shaped to mount a blower 28 by which fluid is drawn through the mold and exhausted into conduit 30. Walls 18 and 19 thus define between them, a space 27 extending about the exterior of walls 18.

An annular, generally imperforate heat-insulating wall 20 surrounds wall 19 in spaced relation therewith, to form with wall 19 a second and outer jacket chamber 19a into which steam may be passed by means of pipes 24. The base of the mold is shown as formed by a stiffened and reinforced foraminous plate 21. Thus, granules of material 22 are fed downwardly into the mold and are confined therein by walls 18 and 21. Feeding is effected by heated air drawn downwardly by blower 28, exhausted through conduit 30, reheated and recirculated. As has been previously noted, space 19a between walls 19 and 20 may be heated by steam introduced through pipes 24. Condensate is withdrawn through valved outlets 25 in the flanged base of walls 20. Steam is led into chamber 27, between walls 18 and 19, through pipes 26 so that it may pass through foraminous walls 18, into the mold in uniform insufflation of the granules therein.

Figure 3:
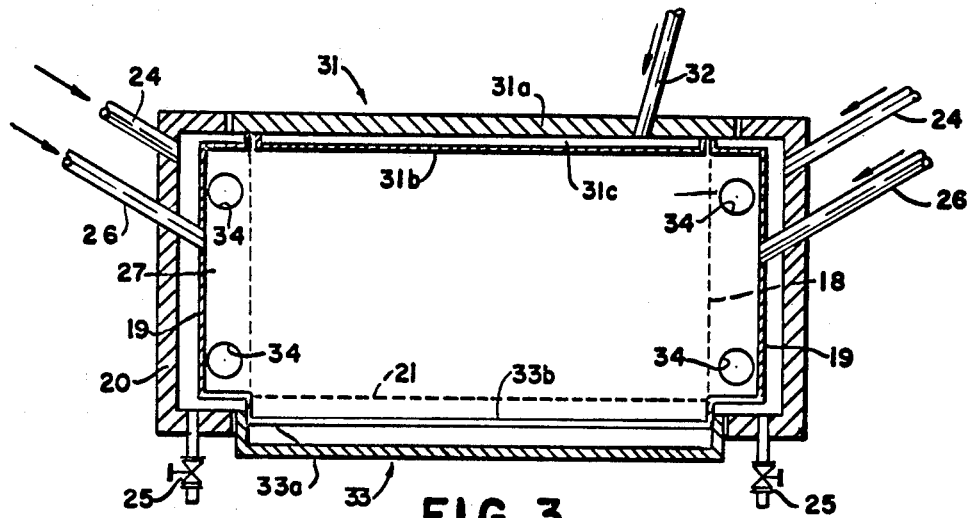
FIG. 3 is a section corresponding to FIG. 2 but showing the mold with charging means removed and replaced by closures for the otherwise open bottom and top of the mold.

Ducts 23 and 29 are removably secured with the upper and lower edges, respectively, of the mold jacket. FIG. 3 shows the mold with these ducts removed and replaced by top and bottom covers or closures secured to and closing the top and bottom, respectively, of the mold. The top closure consists of a heatinsulating upper plate 31a and an imperforate lower plate 31b spaced below to define a chamber 31c into which steam may be introduced through feed pipe 32. Conduit means not shown, are provided by which chamber 31c may be drained of condensate.

Similarly, bottom closure 33 may consist of a lower heat-insulating plate 33a surmounted by an imperforate plate 33b having its rim upwardly flanged to effect a sealed joint with the rim of the inwardly-flanged bottom edge of walls 19.

When covers or closures 31 and 33 are in place, the mold including annular space or chamber 27, is effectively sealed so that steam under pressure may be introduced through pipes 26, into the chamber, thence through foraminous walls 18 to permeate, insufflate, expand and cohere the granules confined by walls 18, 21 and 31b into an article of shape determined by those walls. After molding has been completed the mold and formed article therein may be rapidly cooled by the introduction of cooling air through, and its exhaust from, orifices 34 formed in walls 19. These are connected with suitable supply and exhaust ducts not shown.

In this way, where steam under pressure is utilized for the expansion of the granules, it is possible to omit jacket walls 19.

Figure 4:
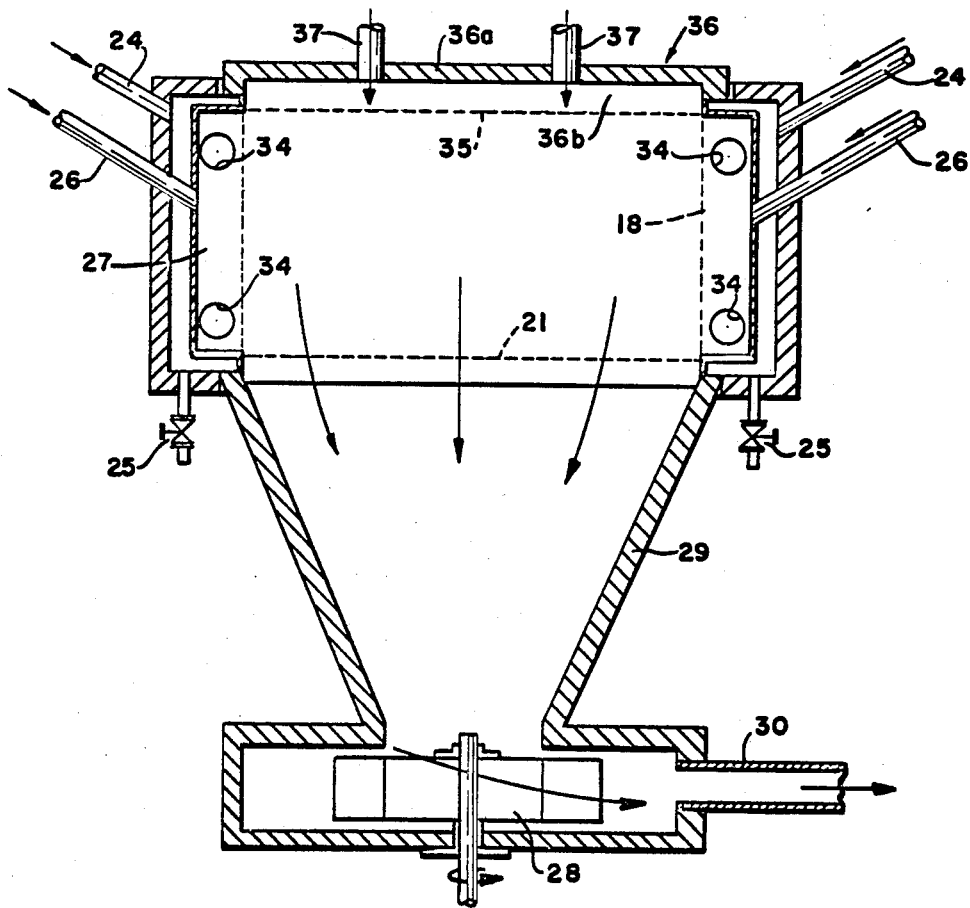
FIG. 4 is a view similar to FIG. 3 but showing the means at the bottom of the mold, for exhausting air therefrom, left in position.

FIG. 4 shows an arrangement wherein superheated steam at atmospheric pressure, is utilized for insufflation of the material. In this modification exhaust duct 29 and impeller 28 are left in position as in FIG. 2, but feed or supply duct 23 is removed and replaced by a top closure generally identified at 36, and comprising a heat-insulating plate 36 and a foraminous plate 35 fixed in spaced relation therewith to define a space 36b. Superheated steam is introduced into this space through pipes 37, and is drawn into the mold and through the mass of granules therein by impeller or blower 28. The material is thus rapidly and uniformly heated.

During filling and operation of the mold, jacket 19 is heated by steam moving in through pipes 24. After molding has been completed the supply of heating steam is cut off and steam for expanding the granules is supplied through pipes 26 and 37. Then, after molding is completed the supply of steam through those pipes is cut off and the molded material is rapidly cooled by passing air into chamber 27.

Figure 5:
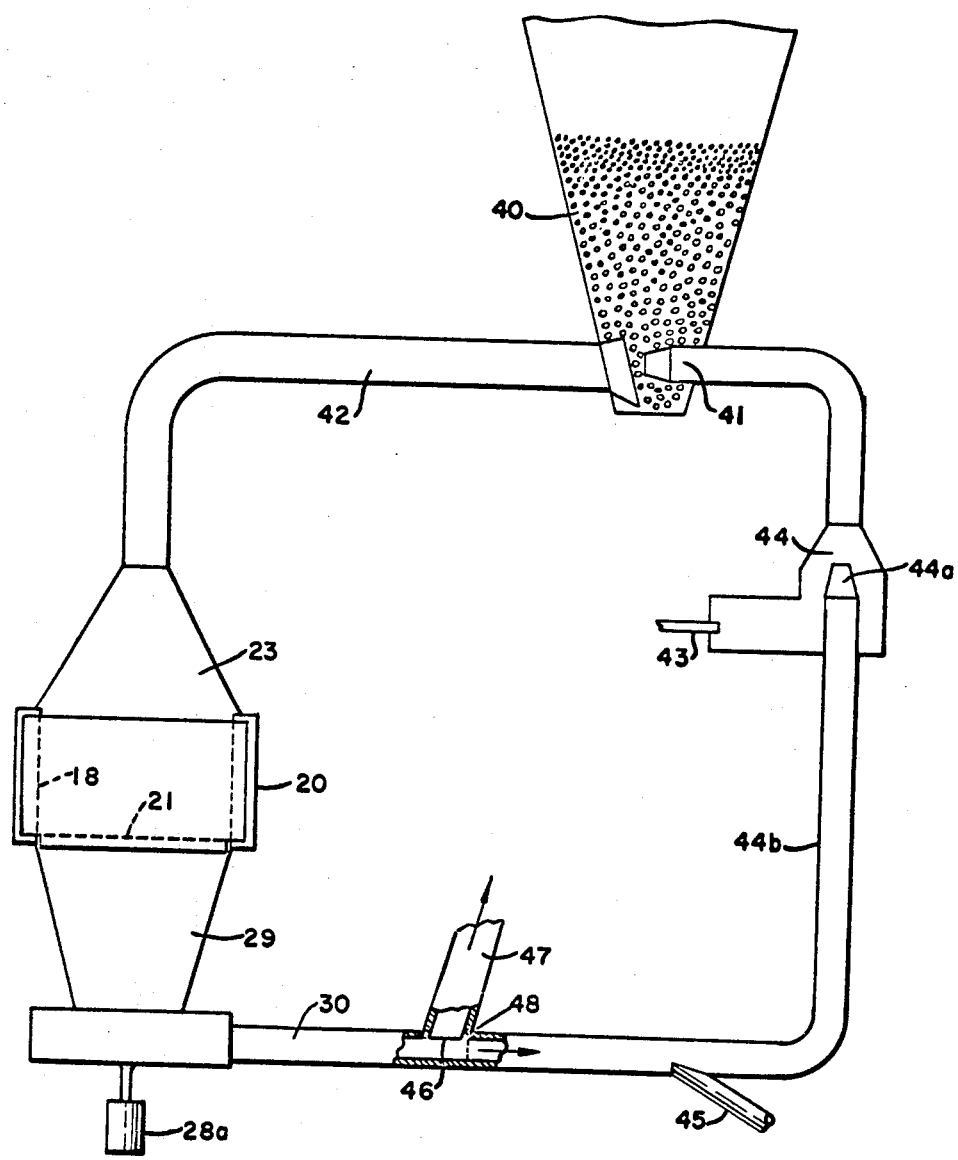
FIG. 5 is a diagrammatic view showing a complete circuit for conveying granules from hopper to mold, and returning and reheating the air.

FIG. 5 illustrates schematically the complete installation including mold parts 18, 20, 21, 23, 29, etc., and a motor 28a driving blower or impeller 28. The granules which may be at atmospheric temperature or higher, for example 60° C. are contained in hopper 40 and are transported through conduit 42, into the mold, by the flow from nozzle 41, of heated air. The nozzle is mounted as shown, in the base of the hopper and directs a blast into the open end of conduit 42. Thereby the granules of material are conveyed in a steady and uniform stream, into the mold. The length of conduit 42 between hopper 40 and the mold, is such that, based upon the rate of travel of the entrained granules therethrough, they are preheated to a temperature at or near their softening point by the time they pass into the mold. This temperature in the case of polystyrene is about 115° C.

Most of the heated air thus traversing the mold, and drawn off by blower 28, passes through conduit 30 to nozzle 41. Heat loss during circulation is made up by a burner 43 which directs heated gas into a manifold chamber 44 from which it is aspirated by nozzle 44a at the terminal end of conduit 44b. In order to insure proper functioning of the apparatus, a certain proportion of the gas traversing conduit 44b may be drawn off through an outlet or exhaust pipe 45.

After the proper desired amount of granules have been deposited into the mold, circulation of heated air and entrained granules into the mold, is cut off and the air and granules proceeding through pipe 42 may be directed into a second and empty mold like the one shown. Thus a number of molds may be supplied from a common source such as hopper 40.

Subsequent procedure is then in accordance with that described in connection with FIG. 3, or with FIG. 4. In the first instance, expansion of the granules and the molding thereof, are effected by steam under pressure above atmospheric. In the second instance, expansion and molding of the granules are effected by the injection of superheated steam introduced at atmospheric pressure through pipes 37, FIG. 4, and if necessary, through conduits 26. Impeller 28 acts to effectively circulate the steam to thoroughly insufflate the granules confined within the mold. The steam is drawn from an exhaust pipe 47 in communication with exhaust conduit 30. A damper 46 is pivotable about an axis 48 so that it may be pivoted from the full line position shown, wherein escape of gas by way of pipe 47 is prevented, to the dotted line position wherein flow through conduit 44b is cut off and steam is directed out through pipe 47.

The temperature values indicated in the preceding paragraphs are for granules of polystyrene which are fluently entrained and spread out in transport. The procedure may be used, however, with other thermoplastic expansible materials or granules, at temperatures which will vary in accordance with the specific thermoplastic being molded. The temperature of the air employed to preheat the granules may be considerably above that of the softening point of the material, provided that the period of contact between the heated air and the material is not too long. The temperature of the superheated steam used is preferably approximately that of the softening point of the material being molded. It can also be somewhat less than that of the softening temperature of the material. It will be understood that in all cases the openings or apertures in screens 18, 21, etc., and in belts 3, 4, etc., are small enough to prevent the passage therethrough of discrete granules of material to be expanded, cohered and shaped, while collectively ample to allow free passage of air and steam therethrough.

While I have disclosed the preferred means by which the invention may be carried into practice, both in a continuous and in a discontinuous procedure, numerous modifications, alterations and substitutions of equivalents will readily occur to those skilled in the art, after a study of the foregoing description and drawing. Hence the disclosure should be taken in an illustrative rather than a limiting sense.

Having fully disclosed the invention, what I claim and desire to secure by Letters Patent is:

1. Apparatus for molding thermoplastic granular material to insufflate, expand and cohere the granules into predetermined form, comprising, a supply hopper for granular material, a mold, a first conduit connecting said supply hopper and said mold, second conduit means for directing heated gas into said hopper to entrain and convey granules therefrom in a steady stream into and through said first conduit into said mold, and blower means operable to impel heated gas through second conduit means into said hopper, first conduit and said mold.

2. Apparatus according to claim 1 in which said mold has foraminous side and bottom walls, a first imperforate wall surrounding said side walls and forming therewith a first annular chamber, duct means detachably connecting the first conduit means with the mold and effective to guide material into said mold, second duct means detachably connecting said mold below the foraminous bottom wall thereof to said second duct means, and means to direct steam into said hopper and thence into said mold.

3. The apparatus of claim 2, said second conduit being connected with said second duct means to receive and recirculate to said hopper, gas passing through said mold and the foraminous bottom wall thereof.

4. In the apparatus of claim 3, heater means connected with said second conduit to supply heated make-up gas thereto, and to said hopper.

5. In the apparatus of claim 4, an exhaust opening in said second conduit, and a damper associated with said opening and movable from a first position obturating said opening, to a second position directing all gas from said second duct means, through said opening.

6. In the apparatus of claim 2, a second imperforate wall surrounding said first imperforate wall in spaced relation therewith, to form a second closed annular chamber, and second pipe means connected with said second wall to convey fluid into said second annular chamber, to preheat said mold.

7. In the apparatus of claim 2, first and second closures for said mold and securable thereto to close and seal the open top and bottom thereof when said first and second duct means are removed, each said closure comprising spaced imperforate walls defining a closed chamber therebetween, and a pipe connected with the chamber formed by the spaced walls of said top closure, to conduct heated fluid thereinto.

8. The apparatus of claim 2, and means for conducting coolant to, and exhausting the same from, said first annular space.

* * * * *